(12) United States Patent
Padmore et al.

(10) Patent No.: US 8,331,027 B2
(45) Date of Patent: Dec. 11, 2012

(54) ULTRA-HIGH DENSITY DIFFRACTION GRATING

(75) Inventors: Howard A. Padmore, Berkeley, CA (US); Dmytro L. Voronov, El Cerrito, CA (US); Rossana Cambie, Moraga, CA (US); Valeriy V. Yashchuk, Richmond, CA (US); Eric M. Gullikson, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 548 days.

(21) Appl. No.: 12/510,900

(22) Filed: Jul. 28, 2009

(65) Prior Publication Data

US 2010/0053611 A1  Mar. 4, 2010

Related U.S. Application Data

(60) Provisional application No. 61/084,551, filed on Jul. 29, 2008.

(51) Int. Cl.
*G02B 5/18* (2006.01)
*G01J 3/28* (2006.01)

(52) U.S. Cl. ............... 359/576; 359/571; 356/328

(58) Field of Classification Search ............ 359/571, 359/576; 356/328
See application file for complete search history.

(56) References Cited

U.S. PATENT DOCUMENTS 4,915,463 A * 4/1990 Barbee, Jr. ............ 359/360
6,392,792 B1 * 5/2002 Naulleau ............... 359/360

OTHER PUBLICATIONS

Franke, A.E., et al., "Supersmooth x-ray reflection grating fabrication," J. Vac. Sci. Technol. B, vol. 15(6): p. 2940-2945 (1997).
de Korte P. A. J., "High-throughput replica optics," Applied Optics vol. 27(8), 1440-6 (1988).
Hudec R, et al., "Grazing incidence replica optics for astronomical and laboratory applications," Applied Optics, vol. 27(8), 1453-5 (1988).
Chen P. C., et al., "Development and Status of a New Optical Technology for UV Space Astronomy" Astronomical Society of the Pacific conference series [1050-3390], vol. 164, 459 (1999).
Ulmer, M. P., et al., "Production and performance of multilayer coated conical mirrors", Applied Optics vol. 42(34), 6945-6952 (2003).
Chih-Hao Chang, et al., "Fabrication of sawtooth diffraction gratings using nanoimprint lithography," J. Vac. Sci. Technol. B vol. 21(6), 2755 (2003).

(Continued)

*Primary Examiner* — Alessandro Amari
(74) *Attorney, Agent, or Firm* — Weaver Austin Villeneuve & Sampson LLP

(57) ABSTRACT

A diffraction grating structure having ultra-high density of grooves comprises an echellette substrate having periodically repeating recessed features, and a multi-layer stack of materials disposed on the echellette substrate. The surface of the diffraction grating is planarized, such that layers of the multi-layer stack form a plurality of lines disposed on the planarized surface of the structure in a periodical fashion, wherein lines having a first property alternate with lines having a dissimilar property on the surface of the substrate. For example, in one embodiment, lines comprising high-Z and low-Z materials alternate on the planarized surface providing a structure that is suitable as a diffraction grating for EUV and soft X-rays. In some embodiments, line density of between about 10,000 lines/mm to about 100,000 lines/mm is provided.

16 Claims, 4 Drawing Sheets

OTHER PUBLICATIONS

Arzberger S.C., et al., "Elastic memory composite technology for thin, lightweight space and groundbased deployable mirrors," Proc. SPIE 5179(1), 145-56 (2003).

Ulmer M. P., et al., "Replication as an alternative approach for large segmented telescopes," Proc. 5382(1), 323-30 (2004).

J.H. Underwood et al. in "Multilayer-coated echelle gratings for soft x rays and extreme ultraviolet," Rev. Sci. Instrum. vol. 66(2): p. 2147-2150 (1995).

Spiller, E., *Soft X-ray Optics* (SPIE, Bellingham, WA, 1994), Applications of Soft X-ray Optics.

Kortright, J. B., "Status and limitations of multilayer X-ray interference structures," Journal of Magnetism and Magnetic Materials 156(1-3), 271- 5 (1996).

A.E. Fedorenko "Structure of Sc/Si multilayer mirrors in as-deposited state and after anncaling," Journal of X-Ray Science and Technology 9(1), 35-42 (2001).

V. E. Levashov, E. N. Zubarev, A. I. Fedorenko, V. V. Kondratenko, O. V. Poltseva, S. A. Yulin, I. I. Struk, A. V. Vinogradov, "High throughput and resolution compact spectrograph for the 124-250 Å range based on $MoSi_2$-Si sliced multilayer grating," Optics Comm. 109, 1-4 (1994).

R. M. Fechtchenko, A. V. Vinogradov, and D. L. Voronov, "Optical properties of sliced multilayer gratings", Optics Comm. 210, 179-186 (2002).

Voronov et al, "Development of an ultra-high resolution diffraction grating for soft X-rays" (Proc. SPIE 6705, 67050E-1 (2007)).

Voronov et al., "Fabrication and Characterization of a New High Density Sc/Si Multilayer Sliced Grating" presented at SPIE Symposium 'Optics and Photonics 2008' (San Diego, CA, Aug. 11, 2008).

Voronov et al., "5000 groove/mm multilayer-coated blazed grating with 33% efficiency in the 3rd order in the EUV wavelength range", Proc. of SPIE vol. 7448 74480J-1 (2009).

Weiner A. M. and Heritage J. P., "Picosecond and femtosecond Fourier pulse shape synthesis." Revue de Physique Appliquee 22(12), 1619-28 (1987).

Kumagai, H., "Recent Progress in Soft X-ray Multilayer Mirrors Through Atomic Layer Deposition/Epitaxy Methods", Review of Laser Engineering vol. 25, No. 5: 355-61, Abstract, May 1997.

Laboratory Directed Research and Development Program, Mar. 2008, "Ultra-high resolution optics for soft x-ray inelastic scattering Principal" Investigator(s): Valeriy V. Yashchuck.

Laboratory Directed Research and Development Program, Mar. 2009, "Ultra-high resolution optics for soft x-ray inelastic scattering Principal" Investigator(s): Valeriy V. Yashchuck.

* cited by examiner

ULTRA-HIGH DENSITY DIFFRACTION GRATING

CROSS-REFERENCE TO RELATED APPLICATIONS

This application claims benefit of prior U.S. Provisional Application No. 61/084,551 filed Jul. 29, 2008, titled "Ultra-high Density Diffraction Grating" naming Padmore et al. as inventors, which is herein incorporated by reference in its entirety and for all purposes.

STATEMENT OF GOVERNMENTAL SUPPORT

This invention was made with government support under Contract No. DE-AC02-05CH11231 awarded by the United States Department of Energy. The government has certain rights in the invention.

FIELD OF THE INVENTION

The invention relates to diffraction grating structures and methods of their fabrication. More specifically, the invention relates to ultra-high density diffraction grating structures suitable for diffraction of EUV and soft X-rays in spectroscopic applications.

BACKGROUND OF THE INVENTION

Development of high resolution diffraction gratings for the EUV and soft X-ray energy ranges is an area of interest both in modern astronomy and in precision spectroscopy. Specifically, high resolution diffraction gratings can be used in a number of spectroscopic applications at synchrotron facilities around the world. A relatively new exciting development in high resolution soft X-ray spectroscopy is a method of Resonant Inelastic X-ray Scattering (RIXS) that potentially allows to directly measure the energies of soft excitations of correlated electronic systems such as high $T_c$ superconductors. However, in order to realize the potential of this method, a dedicated spectrometer must achieve energy resolution of about 10 meV in the 100-eV to 5-keV photon energy range. This resolution corresponds to resolving powers that are up to 100 times greater than currently achieved resolution powers. One way to improve the resolution of RIXS spectrometer is to use the first order diffraction of a grating with an ultra-high density of grooves. Fabrication of suitable ultra-high density grating structures, however, presents a number of challenges that impede the development of such gratings. New fabrication methods that can be used to obtain gratings with ultra-high density of grooves are desirable.

SUMMARY OF THE INVENTION

Described herein are an ultra-high density diffraction grating structure and a method of its fabrication. The provided structure can be adapted for use as a diffraction grating in a EUV or a soft X-ray spectrometer, such as in a RIXS spectrometer. Provided structure, in some embodiments, has a line density of between about 10,000-100,000 lines/mm, and can significantly improve resolution of spectroscopic instruments.

In accordance with one aspect, the structure, having a grated surface includes an echellette substrate comprising periodically repeating recessed features; and a multi-layer stack of materials disposed on the echellette substrate, wherein the multi-layer stack has a planarized surface. A plurality of lines are disposed on the planarized surface of the structure in a periodical fashion, wherein lines having a first property alternate with lines having a dissimilar second property (e.g., having a dissimilar optical property), and wherein the individual lines are planarized layers of the multi-layer stack. For example, lines made of low-Z material (e.g., silicon, beryllium, or boron carbide) can alternate with lines made of high-Z material (e.g., molybdenum, scandium, tungsten or ruthenium). Examples of suitable pairs of materials include, without limitation, Mo/Be, Sc/Si, W/$B_4$C, and Ru/$B_4$C. In other embodiments, alternating lines can have dissimilar electrical properties, or dissimilar magnetic properties.

The line density can be in the range of between about 10,000-100,000 lines/mm, whereas the length of lines can be in the range of between about 0.1-1,000 mm. Typically, the lines are substantially straight and are well-aligned.

In a second aspect, a RIXS spectrometer comprising an ultra-high density grating described herein is provided.

In another aspect a method of making a grated structure having ultra-high density grating is provided. The method involves providing an echellette substrate having periodically repeating recessed features with a periodicity of between about 50 nm and 500 µm; depositing a multi-layer stack of materials onto the echellette substrate, wherein the multi-layer stack comprises alternating layers having dissimilar properties; and planarizing the multi-layer stack, wherein the planarization plane is at an oblique angle to the plane of the layers in the stack. In some embodiments, the required echellette structure is obtained by anisotropically etching an asymmetrically cut silicon crystal. Deposition of the multi-layer stack can be performed by a variety of methods including physical vapor deposition (PVD), chemical vapor deposition (CVD), atomic layer deposition (ALD), and combinations thereof. In one embodiment, the entire stack is deposited by PVD. Planarization of the substrate, after the multi-layer stack has been deposited, can be performed, for example, by mechanical polishing, chemical mechanical polishing (CMP), or other planarizing methods. A planar surface, having ultra-high density of lines is obtained after planarization is completed.

These and other features and advantages of the present invention will be described in more detail below with reference to the associated drawings.

DETAILED DESCRIPTION OF PREFERRED EMBODIMENTS

Figure 1:
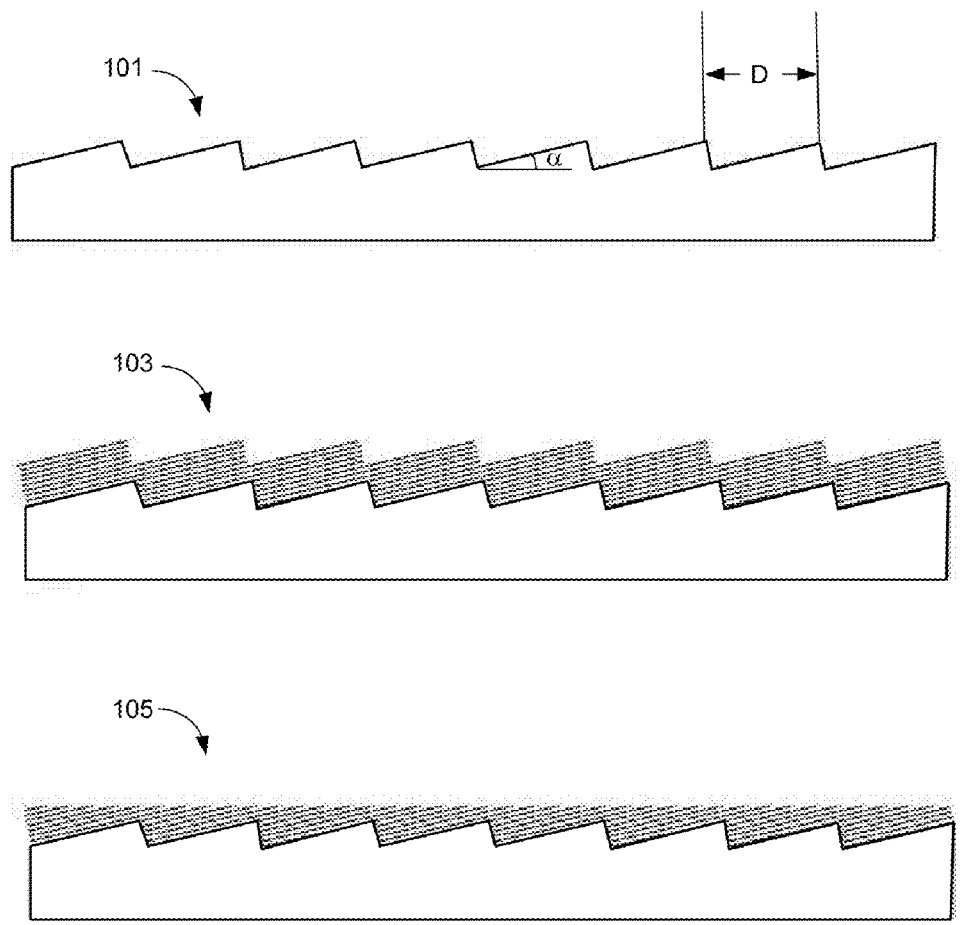
FIG. 1 shows cross-sectional depictions of the diffraction structure during the process of fabrication, in accordance with some embodiments of the invention.

In the following description, the invention is presented in terms of certain specific structures, configurations, and processes to help explain how it may be practiced. The invention is not limited to these specific embodiments. Examples of specific embodiments of the invention are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the scope and equivalents of the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In one aspect, the invention provides a method of fabricating structures having high-density grating. The structures have a planarized surface, which includes a plurality of lines arranged in a periodic fashion. For example, in one embodiment, at least two lines having dissimilar properties (e.g., different refractive indices), alternate on the substrate surface, thereby forming a grated surface, which can be used as diffraction grating. Advantageously, provided methods allow fabrication of structures, in which line densities of at least 3,000 lines/mm, at least 6,000 lines/mm, and preferably between 10,000-100,000 lines/mm or greater are achieved. A further advantage of provided method is that millions of periodically alternating lines can be obtained on the surface with excellent alignment. For example, structures having widths of active portions from between about 1-100 mm (in the direction perpendicular to the lines), accommodating from about 3,000-10,000,000 lines can be fabricated. The length of the active portion of the structure (in the direction parallel to the lines) can range, for example from about 1 mm to about 1,000 mm and more. Such ultra-high density grated structures are particularly well suited for diffraction applications in spectroscopy and optics. In particular, diffraction gratings with these line densities are capable of significantly improving performance of EUV and soft X-ray spectrometers. For example, spectral resolution of Resonant Inelastic X-ray Scattering (RIXS) can be dramatically improved to about $10^5$-$10^6$ using ultra-high density grating described herein.

While this invention will be primarily described with a reference to soft X-ray spectroscopy, and, in particular with a reference to Resonant Inelastic X-ray Scattering, it is understood that use of the structures and methods described herein is not limited to these particular applications. Specifically, ultra-high density gratings can find use in a number of optical and non-optical applications, as it would be appreciated by one of skill in the art.

Figure 2:
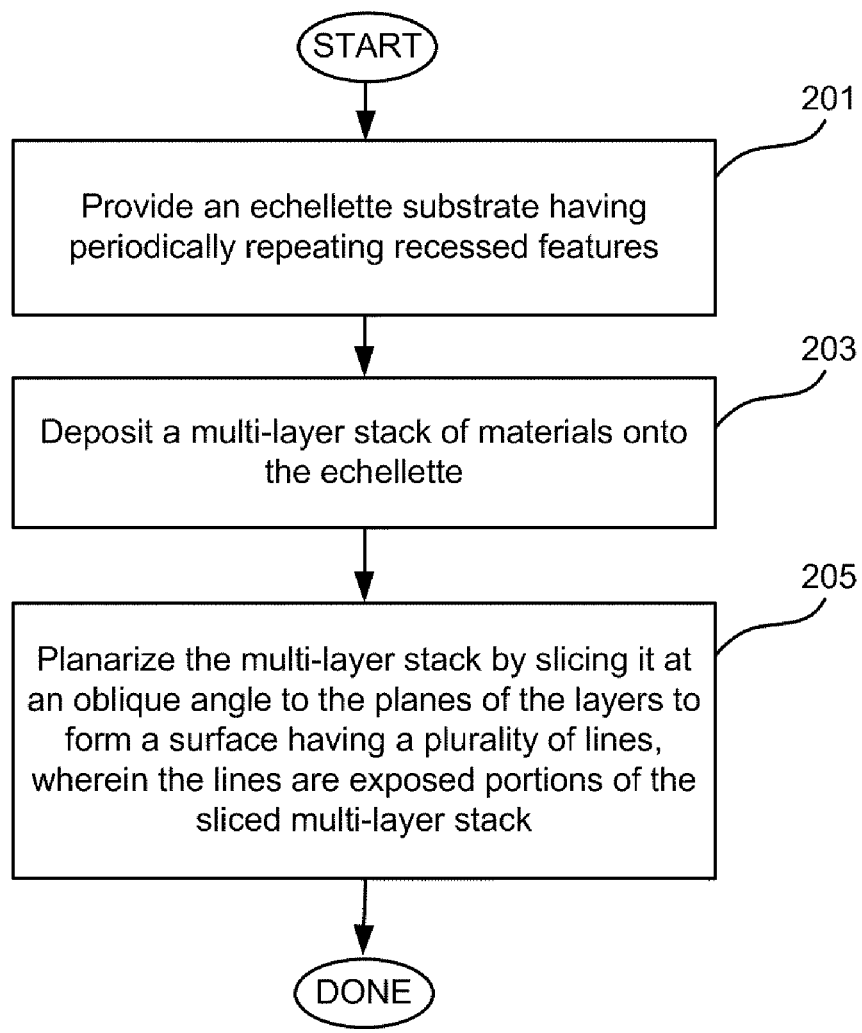
FIG. 2 is a process flow diagram for a method of fabrication of an ultra-high density grating in accordance with some embodiments of the invention.
Figure 3:
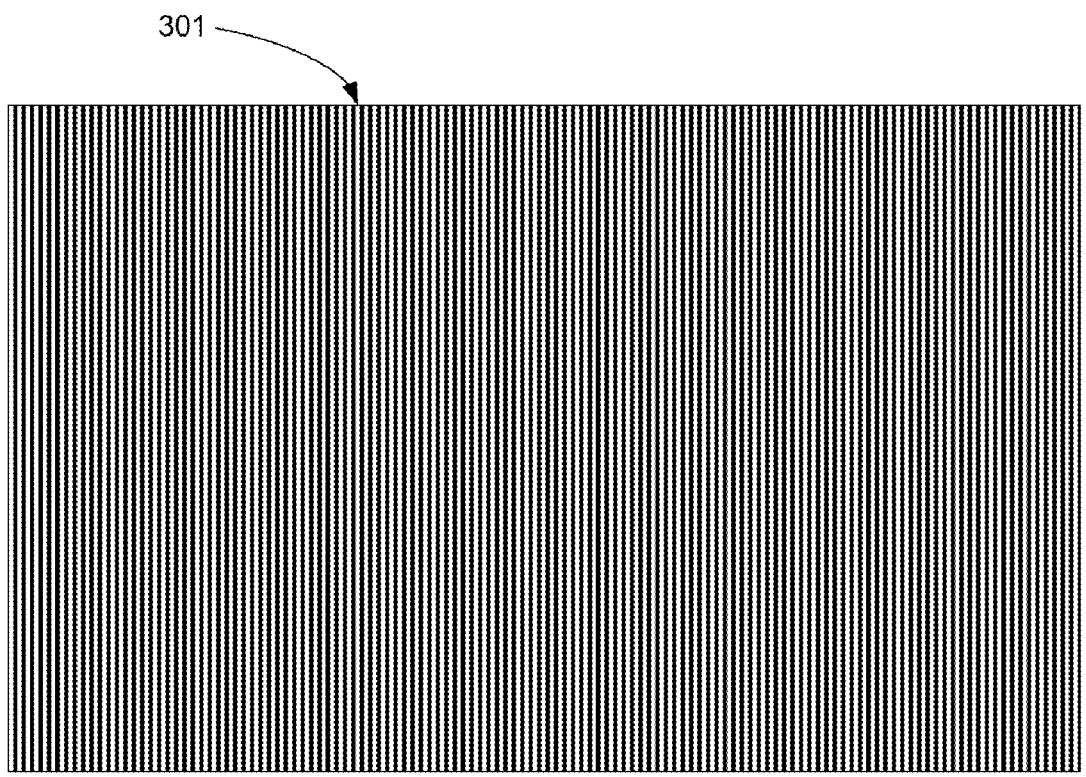
FIG. 3 is a schematic top view of the completed grating structure, illustrating a planarized surface having a plurality of alternating lines, in accordance with some embodiments of the invention.

The process for fabricating high-density grating will now be described with reference to FIG. 1, FIG. 2, and FIG. 3. FIG. 1 shows cross-sectional depictions of the structure in the process of fabrication. Structure 105 is a cross-sectional view of a completed device. FIG. 3 shows a top view of the completed structure. FIG. 2 presents a process flow diagram for the fabrication process.

Referring to FIG. 2, the fabrication process starts in operation 201 by providing an echellette substrate, which includes periodically repeating recessed (and protruding) features. Echellette substrate, as broadly defined herein, refers to any such periodic structure, regardless of the shapes of protruding and recessed features. Most commonly used echellette has a saw tooth profile as depicted in structure 101 in FIG. 1. In other embodiments, the echellette may have a different profile. For example, a triangular-wave shape, and a sine-wave shape echellette structures may be used in some embodiments. However, square-wave type structure and structures having recesses formed exclusively at 90 degree angles (e.g., rectangular trenches as seen in cross-section), should not be used.

The period of an echellette, D, ranges in some embodiments from about 50 nm to about 500 μm, preferably from about 200 nm to about 10 μm. In a saw tooth echellette 101 shown in FIG. 1, the inclination angle of each step (blaze angle α) ranges in some embodiments from 0.1 to 80 degrees, preferably from 0.1 to 25 degrees, e.g., from 5 to 10 degrees. In specific examples, 6 degree, 7 degree, and 9 degree angles are used.

The echellette can be made of virtually any material which can serve as a support substrate. Semiconductor materials (e.g., crystalline silicon and silicon compounds), metals and alloys (e.g., nickel, aluminum, steels, bronze, brass), and insulators (glass, polymers and copolymers, e.g., epoxy resin, mylar, etc.) may be used. The substrate can be directly fabricated using standard grating ruling methods, rapid prototyping or standard lithographic methods (e.g., standard optical photolithography, electron beam lithography, interference lithography, nanoprinting, etc.). A periodic pattern can be defined using a hard mask (e.g., silicon nitride) deposited on the substrate. The pattern can subsequently be etched to form a desired echellette structure. These methods are well known in the fields of micro and nano fabrication, and will not be described in detail. Examples of etching methods include but are not limited to reactive ion etching, electron beam etching, electrochemical etching, and wet chemical etching.

In some embodiments, echellette substrate may be replicated from a master substrate or from a replica using known replication methods such as step and repeat nanoimprint. In a replication process, a material is deposited onto the master substrate (e.g., onto an echellette fabricated with the technologies described above), and is then separated from the master substrate to form a negative replica of a master echellette. In some embodiments, due to high echellette symmetry, a negative replica can be directly used for fabrication of a grating. In other embodiments, a second replication is performed, to make a positive replica, identical to the master. Examples of replication methods include replication by epoxy resin molding, replication by casting, embossing, physical (PVD), chemical (CVD), electrochemical or electroless deposition of metals, glass replication, and replication using elastic memory composite technology. For example nickel and aluminum deposition can be used for making metal replicas of an echellette substrate. In a specific example, electroless nickel plating is used to make a nickel replica of a substrate.

In one specific embodiment, echellette 101 is directly fabricated by anisotropically etching an asymmetrically cut Si crystal. This method is based on the fact that anisotropic etchants etch a crystalline substrate in a preferential direction in the crystal. Therefore, by cutting a silicon crystal at a certain angle to one of its crystallographic planes, and by contacting (e.g., submerging) the crystal with an anisotropic etchant, recessed features having variable depth, as depicted in 101, can be obtained. The production of nearly atomically perfect gratings using this technology has been demonstrated by Franke et al. [Franke, A. E., et al., "Super-smooth x-ray reflection grating fabrication," J. Vac. Sci. Technol. B, 15(6): p. 2940-2945 (1997)], which is herein incorporated by reference in its entirety and for all purposes.

In one embodiment, an improved method of fabricating an echellette 101 using anisotropic etching of asymmetrically cut silicon is provided. The method is used to obtain atomically smooth echellette surfaces and surfaces having constant periodicity over a large area of a substrate. The method starts with {111} Si wafers obtained by Czochralski (CZ) or float zone (FZ) crystal growth processes. In some embodiments, FZ silicon is preferred due to lower oxygen content and lower impurity content which is associated with reduced amount of defects. The silicon crystal is cut such that there is an inclination angle of the surface plane from the {111} crystal plane. The inclination can be made, for example, towards either direction $\langle \bar{1}\bar{1}2 \rangle$, or direction $\langle \bar{1}\bar{1}2 \rangle$. The angle of inclination of the surface plane from the {111} crystal plane typically corresponds to the desired blaze angle of the fabricated echellette. Thus, for example, to obtain echellette blaze angles from 0.1 to 80 degrees, preferably from 0.1 to 25 degrees, e.g., from 5 to 10 degrees, the silicon wafer is cut at the same angles of inclination of the surface plane from the {111} crystal plane. In one experimental example, an echellette with a 6 degree blaze angle α is obtained by anisotropically etching an asymmetrically cut Si crystal having a 6 degree inclination of surface plane from the {111} crystal plane. Pre-cut silicon crystals with desired inclination angles can be obtained, for example, from Nova Electronic Materials Ltd. of Carrollton, Tex., and SiltroniX Inc. of Archamps, France.

Next, the asymmetrically cut silicon substrate is patterned with the grating pattern. This involves, in one embodiment, depositing a low stress silicon nitride on the wafer, followed by printing the grating pattern onto the nitride layer by contact lithography followed by reactive ion etching (RIE). At the end of the photolithographic process, the silicon wafer surface includes portions of exposed silicon and periodically disposed silicon nitride hard mask lines, with the period substantially equal to the desired echellette period.

Next, the wafer is submerged into an anisotropic silicon etchant. Although a variety of silicon anisotropic etchants at different concentrations and temperatures may be used, including ethylene diamine pyrocatechol (EDP) and hydroxide etchants such as potassium hydroxide (KOH) and tetramethylammonium hydroxide (TMAH), particularly good results can be obtained by first contacting the patterned silicon substrate with a KOH aqueous solution, followed by contacting the substrate with ammonium fluoride ($NH_4F$) aqueous solution. It is believed that using an anisotropic etchant (such as KOH) followed by an anisotropic etchant with a higher anisotropy of etching towards silicon, such as $NH_4F$, significantly improves the morphology of the etched structure.

In one embodiment, an echellette 101 having a 10 μm period D and a 6 degree blaze angle α was obtained by submerging the asymmetrically cut crystalline silicon wafer patterned with a silicon nitride hard mask into a 20% aqueous KOH solution for about 3.5 hours, followed by a dipping into a 40% aqueous solution of ammonium fluoride for about 20 minutes. The concentrations of solutions refer to weight percent. Both operations are performed in oxygen-containing ambient atmosphere. The wafer substrate was rinsed with water and dried after KOH treatment and before $NH_4F$ treatment.

The KOH etching is performed preferably (but not necessarily) at a temperature range from 20 degrees C. to 25 degrees C. A magnetic stirrer equipment is used to spin a magnetic stir bar, immersed into the KOH solution, at a predefined speed at about 650 rotations per minute. Once the flow is stabilized at the selected speed, the substrate is submerged into the chemical etchant solution. It was observed that prolonged exposure to the etchants enhance the pit growth. Therefore, in order to avoid pit formation, it is preferable to limit the exposure to the etchant. For example, for each etchant, time leading to appearance of the first pit may be measured and tabulated. The process time is then adjusted to perform etching until pits appear.

The use of ultrasonic and megasonic agitation as well as the addition of surfactants into the anisotropic chemical etchant solution may also improve the morphology of the echellette surface.

The method described above provides a smooth echellette 101. After the echellette is fabricated, it may serve as a master for making one or more replicas. For example, a replica may be made by coating the master echellette with an epoxy resin (or any other molding material), which can then be cured (e.g., thermally or by UV), to provide a hard substrate which has the same geometry as the master. The epoxy replica may be used in subsequent fabrication steps as an echellette substrate, or, alternatively, it may serve as a mold for making echellettes from other materials. Methods of making replicas at this fabrication scale are generally known, and are described, for example, in the following papers which are herein incorporated by reference in their entirety and for all purposes: de Korte P. A. J., "High-throughput replica optics," Applied Optics 27(8), 1440-6 (1988); Hudec R, et al., "Grazing incidence replica optics for astronomical and laboratory applications," Applied Optics, 27(8), 1453-5 (1988); Chen P. C., et al., "Development and Status of a New Optical Technology for UV Space Astronomy" Astronomical Society of the Pacific conference series [1050-3390], 164, 459 (1999); Ulmer, M. P., et al., "Production and performance of multilayer coated conical mirrors", Applied Optics 42(34), 6945-6952 (2003); Chih-Hao Chang, et al., "Fabrication of sawtooth diffraction gratings using nanoimprint lithography," J. Vac. Sci. Technol. B 21(6), 2755 (2003); Arzberger S. C., et al., "Elastic memory composite technology for thin, lightweight space and ground-based deployable mirrors," Proc. SPIE 5179(1), 145-56 (2003); and Ulmer M. P., et al., "Replication as an alternative approach for large segmented telescopes," Proc. 5382(1), 323-30 (2004).

After the echellette has been made, the process follows in 203 by depositing a multi-layer stack of materials onto the echellette. Deposition of multi-layer coating on an echellette can be performed using methods described by Underwood et al. in "Multilayer-coated echelle gratings for soft x rays and extreme ultraviolet," Rev. Sci. Instrum. 66(2): p. 2147-2150 (1995), which is herein incorporated by reference in its entirety and for all purposes.

The materials deposited in this step will serve as lines of the grating once fabrication is completed. Therefore, the materials are selected such that they provide the desired properties to the grating. For many diffraction gratings it is preferable to use alternating layers of materials having different optical properties (e.g., different refractive indices). For example, alternating layers containing low-Z and high-Z materials can be used in a diffraction grating, as is well known in the art. Examples of low-Z materials include without limitation graphite, aluminum and aluminum oxide ($Al_2O_3$), silicon, beryllium, strontium, magnesium and magnesium fluoride ($MgF_2$), and boron carbide ($B_4C$). Examples of high-Z materials include without limitation molybdenum, scandium, tungsten, and ruthenium. Combinations of particular low-Z and high-Z materials can be selected for particular wavelengths of the radiation to be diffracted. These combinations are well known in the art and are tabulated in the literature: Spiller, E., Soft X-ray Optics (SPIE, Bellingham, Wash., 1994), and references therein; Kumagai H., "Recent progress in soft X-ray multilayer mirrors through atomic layer deposition/epitaxy methods," Review of Laser Engineering 25(5), 355-61 (1997); Kortright, J. B., "Status and limitations of multilayer X-ray interference structures," Journal of Magnetism and Magnetic Materials 156(1-3), 271-5 (1996), which are herein incorporated by reference in their entirety and for all purposes. These combinations are also listed at publicly available web-sites, e.g., http://www-cxro.lbl.gov/cgi-bin/mldata.pl and http://xdb.lbl.gov/Section4/Sec_4-1.html. Examplary combinations include Mo/Be; Sc/Si; W/$B_4C$, and Ru/$B_4C$. Therefore, in some embodiments, a multilayer stack comprising alternating layers of high-Z and low-Z materials, e.g., alternating layers of molybdenum and beryllium, alternating layers of scandium and silicon, alternating layers of tungsten and boron carbide, and alternating layers of ruthenium and boron carbide are deposited onto the echellette. It is understood that for more general applications materials need not necessarily have dissimilar optical properties. For example in non-optical applications, alternating layers of materials having different chemical properties, different electrical and/or magnetic properties are deposited.

A variety of deposition methods may be used to deposit the multi-layer stack. The methods include without limitation physical vapor deposition (PVD), chemical vapor deposition (CVD) and atomic layer deposition (ALD). In some embodiments it is preferable to deposit the entire stack by one method. However in other embodiments, different methods are used to deposit individual layers of the stack. Examples of physical deposition methods which can be used include magnetron sputtering, thermal deposition, and ion beam deposition. In some embodiments the entire stack is deposited by magnetron sputtering, which can be used to deposit a variety of metals and non-metals, such as silicon and scandium.

The multi-layer stack typically contains from 2 to 100,000 layers, preferably from 10 to 1,000 layers. Preferably no more than 10,000 layers should be deposited, to minimize accumulation of deposition thickness errors.

Depending on a design of the grating structure, the thickness of individual deposited layers can range from about 0.5 to 50 nm, preferably from 1 to about 15 nm. Alternating layers need not necessarily be of the same thickness.

In one experimentally validated example alternating layers of silicon and scandium were deposited on an echellette prepared as described above (10 μm echellette period, 6 degree blaze angle). A total of 40 bi-layers (80 layers) were deposited on an echellette using DC magnetron sputtering to form about 1 μm thick multi-layer stack. Each of the layers was about 13 nm thick. It is understood that upon deposition thin intermediate layers can be formed by mixing/alloying of adjacent layers. While ScSi thin layers were observed at the interfaces between Sc and Si layers, these intermediate layers are not counted toward the line count in the grating.

The Sc/Si multilayer coating was deposited by dc-magnetron sputtering which involved exposing the partially fabricated substrate to materials sputtered from Sc and Si sources in an alternating fashion. The pressure of Ar sputtering gas was ~0.3 Pa. Deposition rates were 0.2-0.3 nm/s for Sc and 0.45-0.5 nm/for Si. The process was performed similarly to deposition process described in a paper by Fedorenko A. I. et al., "Structure of Sc/Si multilayer mirrors in as-deposited state and after annealing," Journal of X-Ray Science and Technology 9(1), 35-42 (2001), which is herein incorporated by reference in its entirety and for all purposes A cross-sectional view of a structure 103 having a multi-layer stack disposed on an echellette is shown in FIG. 1. The structure 103 contains periodically repeating multi-layer stacks, residing at an angle, determined by the blaze angle of the echellette. It can be seen, that the periodicity of the underlying echellette is reproduced upon deposition of the multi-layer stack. In structure 103, multi-layer stack includes periodically repeating recessed and protruding areas with substantially the same period D, which was present in substrate 101. Further it can be seen, that the multi-layer stack is tilted at the blaze angle to the plane of the underlying silicon wafer.

After the stack has been deposited, the structure is completed in operation 205 by performing planarization (slicing) of the multi-layer stack, wherein the planarization plane is at an oblique angle to the plane of the stack. For example, when the echellette region resides on a planar silicon wafer, planarization may be performed parallel to the plane of the wafer substrate (which is at an oblique angle to the tilted stack). Remarkably, it is possible to perform such planarization without removing the stack from the echellette substrate or disturbing relative orientation of the layers. The cross-sectional view of the fabricated structure 105 shows that a planar surface with a plurality of alternating layers is obtained. Advantageously, not only very high density of lines is obtained by this method, but very large number of alternating lines is obtained. Specifically, in this method, millions of alternating lines can be obtained on several mm lengths, without the need of depositing millions of layers on top of each other.

The oblique-angle slicing of multi-layer stacks deposited on an echellette is conceptually different from any of the previously reported grating fabrication methods. The described method allows fabrication of long ranges of ultra-high density lines, which were previously unavailable. Specifically, previously reported methods which involve slicing of a multi-layer stack deposited on a planar substrate at an angle, cannot provide alternating layers over a long range, since it is very difficult to obtain well-aligned stacks containing more than about a few thousands layers. It is the advantageous feature of the methods provided herein that it typically does not require deposition of more than 500 layers to obtain long ranges of aligned alternating layers.

Previously reported methods for slicing multilayers on a planar substrate are described in the following publications, both of which are incorporated herein by reference: V. E. Levashov, E. N. Zubarev, A. I. Fedorenko, V. V. Kondratenko, O. V. Poltseva, S. A. Yulin, I. I. Struk, A. V. Vinogradov, "High throughput and resolution compact spectrograph for the 124-250 Å range based on $MoSi_2$—Si sliced multilayer grating," Optics Comm. 109, 1-4 (1994) and R. M. Fechtchenko, A. V. Vinogradov, and D. L. Voronov, "Optical properties of sliced multilayer gratings", Optics Comm. 210, 179-186 (2002).

Planarization (slicing) of the multi-layer stack on an echellette can be performed by a number of planarization and polishing methods, which include without limitation mechanical polishing, and chemical mechanical polishing (CMP). In the experimentally validated example described above, mechanical polishing with diamond polishing pastes with grain size of 0.25 μm was used to planarize the multi-layer stack. Planarization also removes material deposited on residual silicon nitride pattern. The resulting completed structure contained regions having surface bilayer density of 3700 bilayers/mm (about 270 nm bilayer period, or density of 7400 lines/mm), separated by lines corresponding to planarized silicon nitride mask. The resulting structure had a width (in a direction perpendicular to the lines) of 20 mm and a length (in the direction parallel to the lines) of about 2 inches. It is noted that while planarization removes the periodic recesses derived from the echellette, the resulting structure need not necessarily be planar on a macroscopic level, and may be curved, spherical or hemispherical. In some embodiments, planarization with formation of a curved (e.g., concave) surface is performed.

A top view of a structure which can be formed by methods provided herein is shown in FIG. 3. The structure 301 has a planarized top surface where lines having dissimilar properties alternate. For a diffraction grating, lines having different optical properties are used (e.g., lines containing low-Z and high-Z materials, such as alternating silicon and scandium lines). For other applications, lines having dissimilar chemical properties, or lines having dissimilar electric and/or magnetic properties may be used. The line density of at least about 7,000 lines/mm, preferably between about 10,000-100,000 lines mm (in the direction perpendicular to lines) can be obtained. In some embodiments structures having at least $10^5$ lines and even at least $10^6$ lines are fabricated.

In some embodiments, gratings can include more than 2 alternating lines, e.g., 3-5 lines having different properties may alternate. Such devices are prepared by depositing multi-layer stacks comprising more than 2 alternating layers (e.g., 3-5 alternating layers with dissimilar properties) into the multi-layer stack deposited onto the echellette substrate. Further, the density of the lines can be adjusted by choosing appropriate thicknesses of layers of materials in a multi-layer stack and a blaze angle in the echellette substrate. Further, line widths can be modulated by using an echellette having a different geometry, such as a sine-wave geometry, or a triangular-wave geometry.

In general provided methods allow fabrication of gratings with a line period of about 10-2,000 nm, such as less than 500 nm, e.g., less than about 300 nm, wherein the period is defined as the distance between closest lines having the same property (e.g., white lines in FIG. 3). Line widths can range from about 5 to 1,000 nm, depending on a particular application.

Additional details on fabrication of ultra-high density grating structures described herein are provided in a paper by Voronov et al. titled "Development of an ultra-high resolution diffraction grating for soft X-rays" by Voronov et al. (Proc. SPIE 6705, 67050E-1 (2007)) and in a paper by Voronov et al. titled "Fabrication and Characterization of a New High Density Sc/Si Multilayer Sliced Grating" presented at SPIE Symposium 'Optics and Photonics 2008' (San Diego, Calif., Aug. 11, 2008), which are incorporated herein by reference in their entirety and for all purposes.

It is understood, that while described fabrication method is particularly useful for making ultra-high density diffraction gratings for EUV and Soft X-ray diffraction, it can be also used to form gratings of lower density, e.g., grating for other types of radiation.

Applications

In some embodiments, the ultra-high density diffraction gratings are used for extreme UV and soft X-ray diffraction, specifically for diffraction of radiation with photon energy of between about 20 eV to 8 keV. These diffraction gratings can improve spectral resolution of monochromators and spectrometers used e.g., for Resonant Inelastic X-ray Scattering (RIXS) measurements at such photon energy range. Specifically, a diffraction grating is typically used in a RIXS spectrometer in addition to a low resolution monochromator, in order to analyze radiation with very narrow energy (spectral) resolution. Specifically, at photon energy of about 500 eV to 8 keV energy resolution of about 10 meV and less is desired for RIXS experiments and, therefore, for dedicated spectrometer. Such resolution can be achieved using ultra-high density grating provided herein. This resolution corresponds to resolving powers up to 100 times of the currently achieved resolution in a EUV or soft x-ray spectrometer which uses conventional grating. The gratings disclosed herein can provide alternating lines having density of at least about 3,000, e.g., between about 10,000-100,000 lines/mm in a grating having a width (perpendicular to the lines) of about 0.1-10 mm, therefore providing small-size gratings having, e.g., at least $10^5$ or even $10^6$ lines per structure. RIXS spectral resolution of at least about $10^5$ and at least about $10^6$ can be achieved using these gratings.

Due to the ultra-high density of grating provided herein, smaller structures are needed to provide a given number of lines, and a given spectral resolution. In currently used systems, large diffraction structures are used in order to accommodate a large number of diffraction grooves. Therefore, diffraction structure needs to be placed at a large distance from the radiation source (secondary radiation source) in a spectrometer. It is common that due to this requirement the length of an RIXS spectrometer can reach tens of meters. This is undesirable because at such large distance it is hard to achieve precise alignment and temporal stability between the radiation source and the diffraction device. Advantageously, compact ultra-high density grating can be placed much closer to the radiation source while exposing the same or even greater number of lines to radiation. Therefore compact (1-5 meters in length) high-resolution spectrometers can be built.

Figure 4:
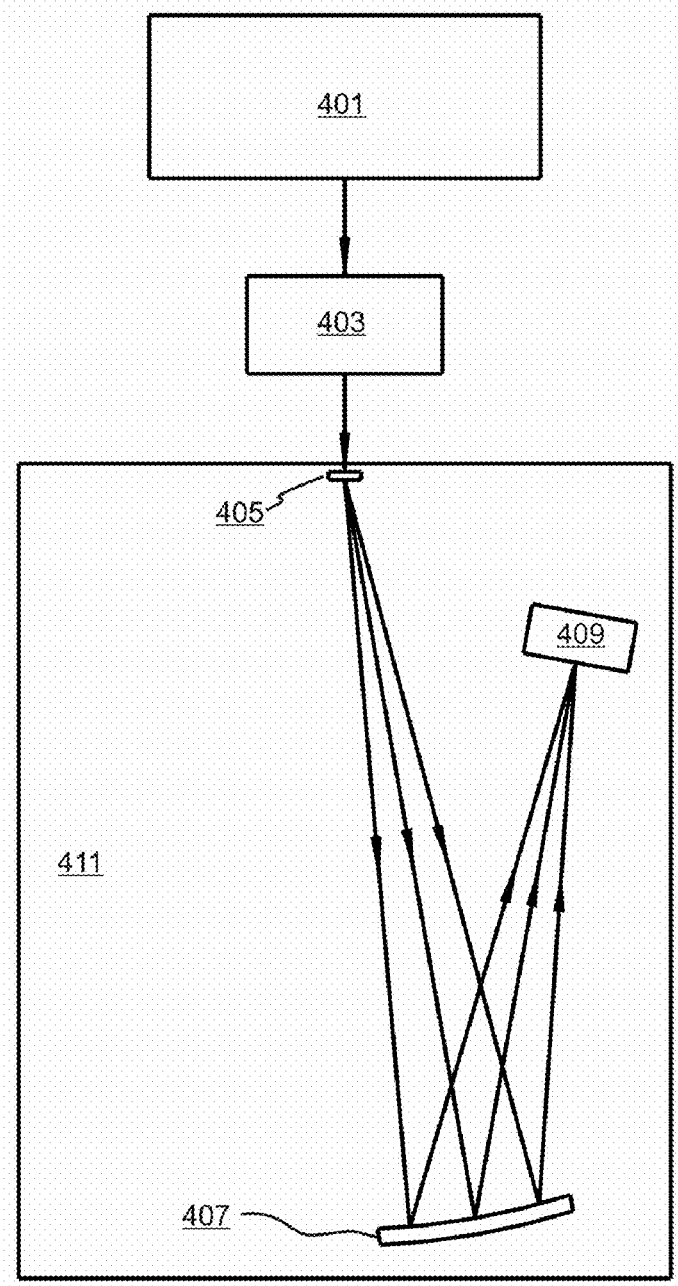
FIG. 4 is a simplified schematic depiction of a RIXS spectrometer in accordance with one aspect of the invention.

FIG. 4 illustrates a simplified schematic diagram of a RIXS spectrometer (e.g., Rowland type spectrometer) which can use a diffraction grating provided herein. The spectrometer 411 receives a radiation beam from a radiation source 401. Radiation source 401 can be any source of radiation which can provide a beam which includes soft X-ray radiation. For example, it can be a synchrotron radiation source. It is understood that the beam undergoes a variety of optical transformations after it leaves the primary source and before it enters the spectrometer. The optical equipment used for such transformation is schematically shown here as 403 to preserve clarity. The radiation from the primary source 401 transformed by optical equipment 403 enters into the spectrometer and irradiates a sample 405 (e.g., a high temperature superconducting material) that is under investigation. Due to interaction with the sample, the secondary radiation coming out of the sample has a modified energy distribution (spectrum). A monochromator incorporated in 403 decreases the energy distribution in the input beam, but cannot decrease the energy distribution sufficiently for high resolution spectroscopy. Therefore, the secondary radiation (obtained upon interaction with a sample) is directed to the ultra-high density diffraction grating 407 to be dispersed by energy and detected with a position-sensitive detector 409.

The diffraction grating is preferably disposed at such distance from the sample, as to dispose substantially all or at least more than 50% of its lines to the beam. Preferably, with the use of high-density grating the distance between the sample 405 and the grating 407 can be less than about 10 m, preferably less than about 3 m, e.g., less than about 1 m. The diffraction grating 407, in some embodiments, is bent in order to more efficiently match to the angular distribution of the oncoming radiation. In some embodiments, a piezoceramic support is connected with the back (inactive) surface of the diffraction grating, such that it is configured to bend the grating during active use. It is understood that the term "planarized" as used with the reference to the surface of the diffraction grating structure does not exclude the possibility that the planarized structure may be bent or otherwise deformed on a macroscopic level. A curved echellette substrate, such as a spherically or semi-spherically pre-shaped substrate which can be obtained using spherical polishing is also within the scope of planarized ultra-high density grating described herein.

Upon diffraction from the grating, radiation having ultra narrow energy distribution of preferably less than about 100 meV, even more preferably of about 10 meV and less is focused at a specific position of the detector 409. This position depends on the energy of the secondary radiation. With scanning of the incidence angle of the radiation to the grating 407, a spectrum of the secondary radiation is measured with energy resolution of preferably less than about 100 meV, even more preferably of about 10 meV and less. RIXS is a powerful technique that potentially allows to directly measure the energies of the soft excitations in correlated electronic systems, such as high-temperature superconductors, and it is, therefore highly desirable to provide high-resolution and compact RIXS spectrometers.

It is understood that the description of the spectrometer shown above is a simplified illustration, and that in some embodiments, the spectrometer may have a different structure. For example, in some embodiments, other types of spectrometers and spectrographs are used and additional optical equipment may be utilized. One would understand how to adapt a particularly engineered spectrometer for use with the ultra high density diffraction grating provided herein.

Another application for ultra-high density diffraction grating involves temporal pulse compression. In this application, a radiation pulse (e.g., an X-ray radiation pulse) having a broader distribution in time can be compressed upon interacting with a pair of the diffraction gratings (a grating compressor) to a temporally more compressed pulse. This compression can be used, for example, in dynamic spectroscopy with subpicosecond and femtosecond resolution [see e.g., Weiner A. M. and Heritage J. P., "Picosecond and femtosecond Fourier pulse shape synthesis." Revue de Physique Appliquee 22(12), 1619-28 (1987), which is herein incorporated by reference in its entirety and for all purposes].

As it was mentioned, high-density diffraction grating can be used not only in laboratory monochromators, spectrometers, and spectrographs, but in a number of optical applications (e.g., in astronomy in ground-based and space-based X-ray telescopes. The use of the grating for space application is particularly advantageous due to the small size and weight of the grating.

Finally, it should be mentioned that the gratings described herein can be employed in any application which can use ultra-high density periodically alternating lines with different properties (e.g., dissimilar chemical properties, electrical properties, magnetic properties, etc.). Advantageously, extremely large numbers of lines can be provided by described methods (e.g., $10^5$-$10^6$ periodically alternating lines). Further, straight lines of several centimeter lengths or more and widths of between about 5-1,000 nm can be provided.

Although various details have been omitted for clarity's sake, various design alternatives may be implemented. Therefore, the present examples are to be considered as illustrative and not restrictive, and the invention is not to be limited to the details given herein, but may be modified within the scope of the appended claims.

What is claimed is:

1. A structure having a grated surface, the structure comprising:
an echellette substrate comprising periodically repeating recessed features;
a multi-layer stack of materials disposed on the echellette substrate;
wherein the multi-layer stack has a planarized surface over the entirety of the grated surface of the structure, and wherein said planarized surface comprises a plurality of lines disposed on the surface of the structure in a periodical fashion, wherein lines having a first property alternate with lines having a dissimilar second property, and wherein individual lines are planarized layers of the multi-layer stack.

2. The structure of claim 1, wherein the line density on the surface is between about 10,000-100,000 lines/mm.

3. The structure of claim 1, wherein the first property and the second property are dissimilar optical properties.

4. The structure of claim 3, wherein the dissimilar optical properties are different refractive indices.

5. The structure of claim 3, wherein lines having a first optical property comprise a low-Z material and lines having a dissimilar second optical property comprise a high-Z material.

6. The structure of claim 5, wherein the low-Z material comprises a material selected from the group consisting of silicon, beryllium, and boron carbide.

7. The structure of claim 5, wherein the high-Z material comprises a material selected from the group consisting of molybdenum, scandium, tungsten, and ruthenium.

8. The structure of claim 5, wherein the structure comprises at least two alternating lines comprising materials selected from the group consisting of Mo/Be, Sc/Si, W/$B_4$C, and Ru/$B_4$C.

9. The structure of claim 8, wherein the line having a first optical property comprises silicon, and wherein the line having the second optical property comprises scandium.

10. The structure of claim 1, wherein the first property and the second property are dissimilar electrical properties and/or dissimilar magnetic properties.

11. The structure of claim 1, wherein the first property and the second property are dissimilar chemical properties.

12. The structure of claim 1, wherein the lines are substantially straight.

13. The structure of claim 12, wherein the spectrometer is a RIXS spectrometer.

14. The structure of claim 1, wherein the structure contains at least about $10^5$ lines and wherein at least some of the alternating lines have lengths of between about 0.1-1,000 mm.

15. The structure of claim 1, wherein the structure is adapted for use as a diffraction grating in a EUV or a soft X-ray spectrometer.

16. A RIXS spectrometer comprising the structure of claim 1.

* * * * *